United States Patent
Son et al.

(10) Patent No.: US 10,805,522 B2
(45) Date of Patent: Oct. 13, 2020

(54) METHOD OF CONTROLLING CAMERA OF DEVICE AND DEVICE THEREOF

(71) Applicant: Samsung Electronics Co., Ltd., Gyeonggi-do (KR)

(72) Inventors: Dongil Son, Chungcheongbuk-do (KR); Heekyeong Kwon, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 15/046,849

(22) Filed: Feb. 18, 2016

(65) Prior Publication Data

US 2016/0165133 A1   Jun. 9, 2016

Related U.S. Application Data

(63) Continuation of application No. 13/886,842, filed on May 3, 2013, now Pat. No. 9,307,151.

(30) Foreign Application Priority Data

Oct. 30, 2012   (KR) ........................ 10-2012-0121094

(51) Int. Cl.
   *H04N 5/232*   (2006.01)
   *H04N 1/00*   (2006.01)
   (Continued)

(52) U.S. Cl.
   CPC ......... *H04N 5/23222* (2013.01); *G06F 3/017* (2013.01); *G06F 3/0482* (2013.01);
   (Continued)

(58) Field of Classification Search
   CPC .. H04N 1/00411; H04N 5/2258; H04N 5/247; H04N 5/23216; H04N 5/23293;
   (Continued)

(56) References Cited

U.S. PATENT DOCUMENTS

| | | | |
|---|---|---|---|
| 5,537,175 | A | 7/1996 | Kamaya et al. |
| 2004/0185878 | A1 | 9/2004 | Woo |

(Continued)

FOREIGN PATENT DOCUMENTS

| | | |
|---|---|---|
| CN | 1113341 A | 12/1995 |
| CN | 1092806 C | 10/2002 |

(Continued)

OTHER PUBLICATIONS

Chinese Search Report dated Aug. 9, 2016.
(Continued)

*Primary Examiner* — Sinh Tran
*Assistant Examiner* — Selam T Gebriel
(74) *Attorney, Agent, or Firm* — Cha & Reiter, LLC

(57) ABSTRACT

Provided are a method of controlling a camera of a device capable of minimizing a vision difference between a front camera and a user by displaying a reduced size preview image within a partial region of a display proximate to a lens of the front camera. When a photo is taken while the user views the reduced size preview image, a more natural image is captured.

58 Claims, 10 Drawing Sheets

(51) Int. Cl.
*G06F 3/01* (2006.01)
*G06F 3/0482* (2013.01)
*G06F 3/0488* (2013.01)
*H04N 5/247* (2006.01)
*H04N 7/14* (2006.01)

(52) U.S. Cl.
CPC ....... *G06F 3/0488* (2013.01); *H04N 1/00442* (2013.01); *H04N 5/23216* (2013.01); *H04N 5/23293* (2013.01); *H04N 5/247* (2013.01); *H04M 2250/52* (2013.01); *H04N 7/144* (2013.01)

(58) Field of Classification Search
CPC .. H04N 5/2319; H04N 5/2322; H04N 1/2125; H04N 13/0484; G03B 2213/025
See application file for complete search history.

(56) References Cited

U.S. PATENT DOCUMENTS

| | | | |
|---|---|---|---|
| 2004/0239792 A1* | 12/2004 | Shibutani | G09G 5/00 348/333.12 |
| 2004/0239799 A1 | 12/2004 | Suzuki et al. | |
| 2008/0084482 A1 | 4/2008 | Hansson et al. | |
| 2008/0220809 A1 | 9/2008 | Hansen | |
| 2008/0298796 A1 | 12/2008 | Kuberka et al. | |
| 2009/0046900 A1 | 2/2009 | Ogawa | |
| 2010/0008657 A1 | 1/2010 | Gassman et al. | |
| 2010/0156941 A1 | 6/2010 | Seung | |
| 2010/0165074 A1 | 7/2010 | Ono et al. | |
| 2010/0302409 A1* | 12/2010 | Matas | H04N 5/772 348/231.99 |
| 2011/0001763 A1 | 1/2011 | Murakami | |
| 2011/0007177 A1 | 1/2011 | Kang | |
| 2011/0033092 A1 | 2/2011 | Lee et al. | |
| 2011/0102621 A1 | 5/2011 | Kim | |
| 2011/0193986 A1 | 8/2011 | Kojima et al. | |
| 2012/0008011 A1 | 1/2012 | Garcia Manchado | |
| 2012/0081592 A1* | 4/2012 | Lim | H04N 5/23293 348/333.04 |
| 2012/0099012 A1 | 4/2012 | Ryu et al. | |
| 2012/0120186 A1* | 5/2012 | Diaz | H04N 5/2258 348/36 |
| 2013/0120602 A1* | 5/2013 | Huang | H04M 1/72522 348/218.1 |
| 2013/0155308 A1* | 6/2013 | Wu | G06T 3/00 348/333.05 |
| 2013/0182062 A1 | 7/2013 | Son et al. | |
| 2013/0235224 A1* | 9/2013 | Park | H04N 5/23222 348/218.1 |

FOREIGN PATENT DOCUMENTS

| | | |
|---|---|---|
| CN | 2620881 Y | 6/2004 |
| CN | 1574851 A | 2/2005 |
| CN | 101820495 A | 9/2010 |
| CN | 101827211 A | 9/2010 |
| CN | 101944349 A | 1/2011 |
| CN | 101945217 A | 1/2011 |
| CN | 102055906 A | 5/2011 |
| CN | 202475516 U | 10/2012 |
| CN | 103795913 B | 11/2017 |
| JP | 11-225319 A | 8/1999 |
| JP | 2004-260433 A | 9/2004 |
| JP | 2010-510743 A | 4/2010 |
| JP | 2011-509572 A | 3/2011 |
| KR | 10-0663478 B1 | 1/2007 |
| KR | 10-2007-0016627 A | 2/2007 |
| KR | 10-2009-0017436 A | 2/2009 |
| KR | 10-2009-0040613 A | 4/2009 |
| KR | 10-2009-0081606 A | 7/2009 |
| KR | 10-2010-0081821 A | 7/2010 |
| KR | 10-2011-0014450 A | 2/2011 |

OTHER PUBLICATIONS

Chinese Search Report, dated Jul. 13, 2017.
European Search Report, dated Sep. 22, 2017.
Korean Search Report dated Jul. 17, 2018.
Chinese Search Report dated Aug. 26, 2019.
Korean Search Report dated Feb. 11, 2020.
Chinese Search Report dated Mar. 16, 2020.

* cited by examiner (PRIOR ART)

METHOD OF CONTROLLING CAMERA OF DEVICE AND DEVICE THEREOF

CROSS REFERENCE TO RELATED APPLICATIONS

This is a Continuation application of U.S. patent application Ser. No. 13/886,842 filed on May 3, 2013 which claims the benefit under 35 U.S.C. § 119(a) of a Korean patent application filed on Oct. 30, 2012 in the Korean Intellectual Property Office and assigned Serial No. 10-2012-0121094, the entire disclosure of which is hereby incorporated by reference.

BACKGROUND

Technical Field

The present disclosure relates to camera devices having a display, and more particularly, to devices including a front camera for shooting in a self-portrait mode, and methods for controlling such devices.

Description of the Related Art

In recent portable terminals having a camera function, the size of the display has gradually increased in size, such that a portable terminal having a display size of five inches or larger has become common. Accordingly, a distance between a location of a front camera for shooting in a self-portrait camera mode and the center of the display displaying a preview image, increases when a larger display is employed. This increase in distance causes a problem in which the user's eyes appear unnatural when shooting in the self-portrait camera mode.

For example, referring to FIG. 1, a portable terminal 10 according to the related art includes a display unit 20 and a front camera 30 provided at the same surface as the display unit 20. In the device 100 according to the related art having a size of four inches or larger, the distance between the center of the display unit 20 and the front camera 30 is several inches. To shoot a photo with the front camera 30, if the user views a preview image displayed on the display unit 20 to confirm a user's feature, the user's eyes gaze at the center of the display unit farther away from the front camera 30. Accordingly, since the user looks at a place other than the camera in the captured photo, the user's eyes in the photograph appear unnatural. To prevent such a phenomenon, a user might stare at the front camera during the shooting, instead of at the display, but this has been shown to be inconvenient and irritating to users.

BRIEF SUMMARY

Disclosed are methods operable in a device having a camera and a display. In embodiments, an image is captured through the camera. Substantially an entirety of the captured image is displayed as a reduced size preview image in a partial region of the display proximate to a lens of the camera.

The reduced size preview image is reduced in comparison to a normal size preview image displayable on the entire display. If the user gazes at the reduced size preview image while a photo is finally taken, a more natural image is captured. That is, the user's eyes can appear to be looking straight ahead, as opposed to looking down as in the self-portrait modes of conventional devices.

BRIEF DESCRIPTION OF THE DRAWINGS

The above features and advantages of the present invention will be more apparent from the following detailed description in conjunction with the accompanying drawings, in which.

DETAILED DESCRIPTION OF EXEMPLARY EMBODIMENTS

Exemplary embodiments of the present invention are described with reference to the accompanying drawings in detail. The same or like reference numbers are used throughout the drawings to refer to the same or like parts. Detailed descriptions of well-known functions and structures incorporated herein may be omitted to avoid obscuring the subject matter of the present invention.

The present invention is applicable to various devices providing a camera function. Examples include hand held general electronic terminals such as a smart phone, a portable terminal, a mobile terminal, a Personal Digital Assistant (PDA), a Portable Multimedia Player (PMP) device, a notebook computer, a Note Pad, a Wibro terminal, a Tablet PC and a smart PC. The invention also has applicability to non-portable electronic devices, such as a smart refrigerator providing a camera function.

Figure 1:
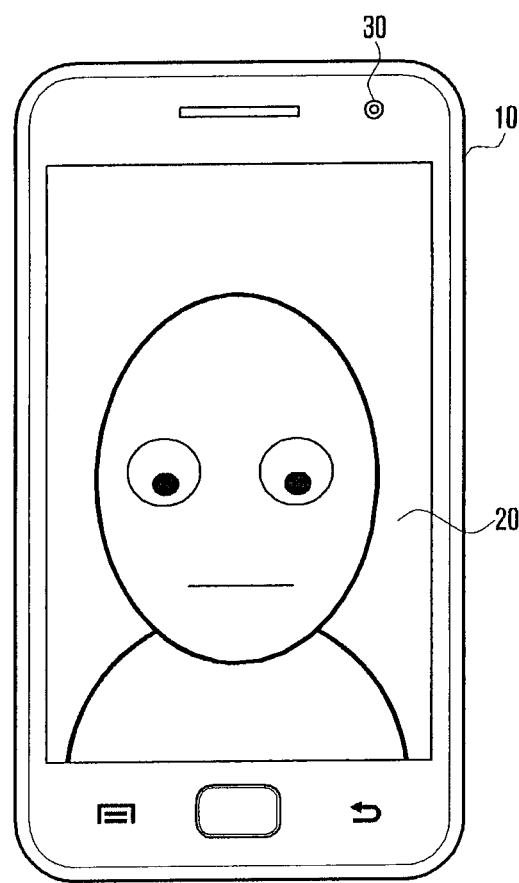
FIG. 1 depicts an image displayed on a related art device, illustrating a problem occurring during shooting an image in the related art.
Figure 2:
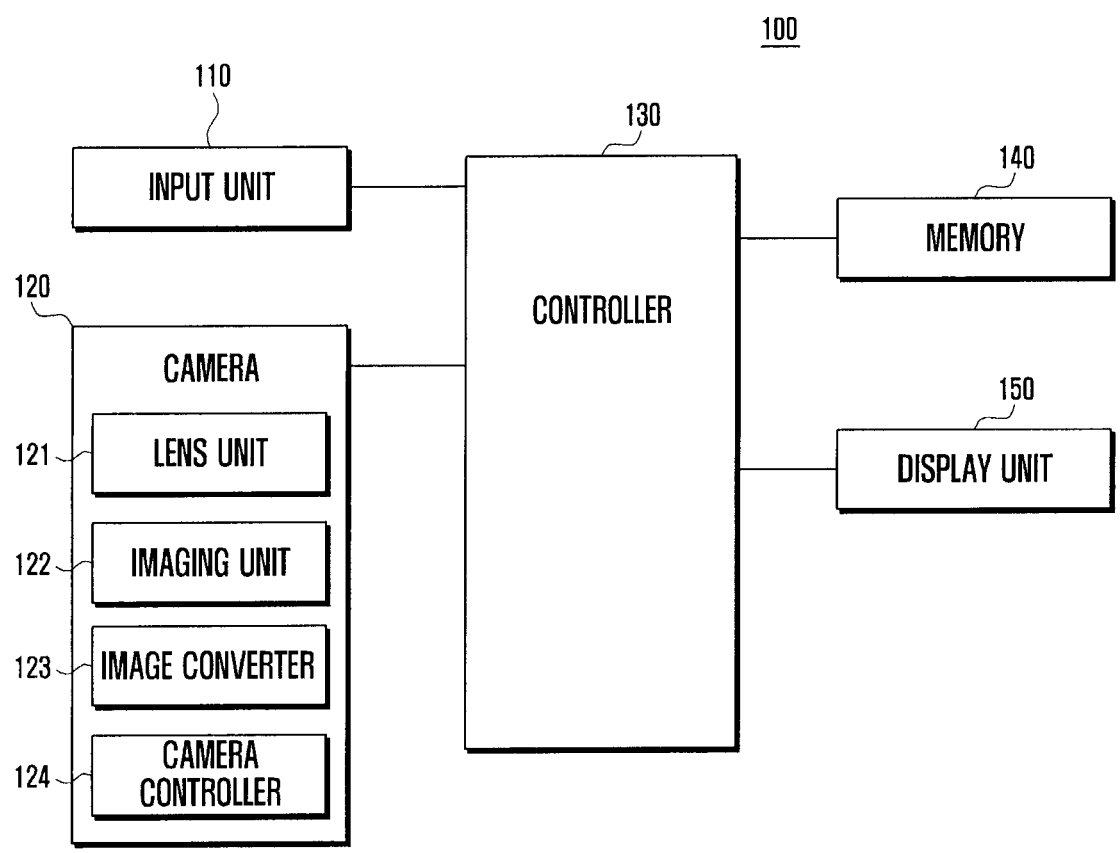
FIG. 2 is a block diagram illustrating a configuration of a device according to an exemplary embodiment of the present invention.

FIG. 2 is a block diagram illustrating a configuration of a device 100 according to an exemplary embodiment. Device 100 includes an input unit 110, a camera 120, a controller 130, a memory 140, and a display unit 150.

According to embodiments of the present invention, the input unit 110 may receive a mode setting input command for displaying a reduced size preview image within a given sub-region of display unit 150. In embodiments, the reduced size preview image is displayed instead of (or in addition to) displaying the same, albeit larger, preview image over the entire display 150 as in a conventional preview image. In embodiments, a front camera lens of device 100 is located at a top portion of device 100. In a self-portrait mode of device 100 in which the front lens is used to capture an image, the reduced size preview image is displayed on a display region proximate the front camera lens. In this manner, the user views the preview image displayed near the lens, just prior to operating a key or touching an icon on the camera to "take the picture". Thus, the user's eyes, when viewing the reduced size preview image, are gazing in a direction close to the front lens, whereby the finally captured image appears natural. That is, the user's eyes in the finally captured image are typically looking straight ahead, rather than looking down. As explained above, in conventional devices a preview image is displayed on the entire display screen such that the user's eyes are typically focused on the center of the screen just prior to taking the picture, and since the front lens is located above the display screen, the user's eyes appear looking down in the finally captured photo. Embodiments described herein avoid capturing this type of unnatural image by displaying a reduced size preview image in proximity to the front camera lens. The input unit 110 generates an operation signal according to input of the user, and may be configured by a key pad, a dome switch, a jog wheel, or a jog switch. The input unit 110 may include a touch sensor, a pressure sensor, a proximity sensor, and/or an electro-magnetic sensor. The input unit 110 may be configured in the form of a pad such as a touch pad (constant pressure/capacitive), an Electro Magnetic Resonance (EMR) pad, and an Electro Magnetic Interference (EMI) pad. The input unit may detect input of a user through sensors, that is, by various input means such as a body (e.g., hand) of the user, a physical tool, and a stylus pen. The input unit 110 may include a plurality of pads forming a layer structure.

The input unit 110 may have a layer structure with the display unit 150 to act as a touch screen. For example, the input unit 110 may include an input pad having a touch sensor and may be configured by a Touch Screen Panel (TSP) coupled to the display unit 150.

The display unit 150 displays (outputs) an image processed by the device 100. For example, the display unit 150 may display a User Interface (UI) e.g., a Graphic User Interface (GUI), associated with shooting of the camera. The display unit 150 may include at least one of a liquid crystal display (LCD), a thin film transistor-liquid crystal display (TFT LCD), an organic light-emitting diode (OLED), a flexible display, and a 3D display. The display unit 150 may have a mutual layer structure with a touch sensor and/or an electromagnetic sensor and act as a touch screen. In this case, the display unit 150 acting as the touch screen may perform a function of an input device.

Hereafter, the noun "display" will refer to all the pixels of a display unit. "Display 150" refers to all the pixels of display unit 150.

According to embodiments of the present invention, the input unit 110 may receive input with respect to an image shooting (i.e., picture taking) request. Further, the input unit 110 may receive input with respect to storage, edit, management, and removal of the shot image.

According to embodiments of the present invention, the input unit 110 may receive a mode setting input command for displaying a reduced size preview image within a given sub-region of display 150.

The camera 120 can capture an image including at least one subject. The camera 120 may include a lens unit 121, an imaging unit 122 converting an optical signal with respect to a subject projected from the lens unit 121 into an electric signal, an image converter 123 processing and converting a signal output from the imaging unit 122 into a digital signal, and a camera controller 124 controlling an overall operation of the camera 120. The lens unit 121 is configured by at least one lens, and collects light to capture an image and to provide the captured image to the imaging unit 122. The imaging unit 122 is configured by a CMOS imaging device or a CCD imaging device, outputs a current or a voltage proportional to brightness of the captured image to convert the image into an electric signal. The imaging unit 122 generates signals for each pixel of an image and sequentially outputs the signals in synchronization with a clock. The image converter 123 converts the signal output from the imaging unit 122 into digital data. The image converter 123 may include a CODEC compressing the converted digital data to a JPEG format or an MPEG format. The digital data converted by the image converter 123 are transmitted to the controller 130 so that the converted digital data may be used for an operation of the device 100.

For example, the controller 130 controls the display unit 150 to display an image captured through the camera 130 as a preview image so that the user may confirm a desired image before inputting a shooting request command to store the displayed preview image in memory, i.e., before "taking the picture". A predetermined icon on the display 150 may be touched to input a shooting request command, or a predetermined shutter button/key may be alternatively provided in a suitable location on device 100. According to generation of a shooting request input by the user, the controller 130 may shoot the image captured through the camera 120 when the shooting request occurs to generate an image. Herein, an image thus shot due to the shooting request is referred to either as a "generated image," a "finally captured" image or as a "photographic image". The generated image may be temporarily or permanently stored in the memory 140. The controller 130 may store a camera setting value at the generation time of the shooting request associated with the generated image as meta data.

At least two cameras or lenses at different locations may be included in device 100. Typically, only one of the at least two cameras is used at any given time. If two or more lenses are included in camera 120 at different locations, a switching means may be employed to switch between the lenses so that the camera captures different images via the respective lenses non-simultaneously. In alternative embodiments, two or more completely independent cameras 120 are provided, enabling simultaneous capture of different images via respective lenses.

Figure 3:
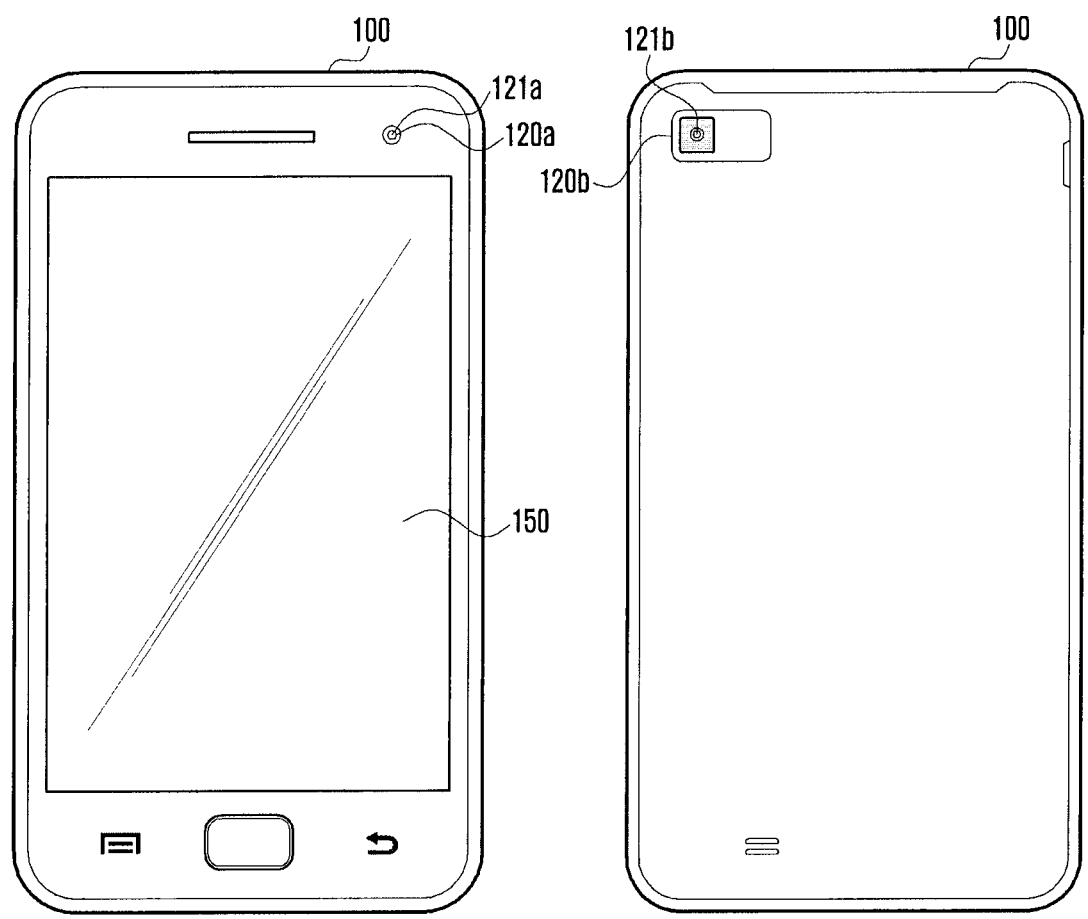
FIG. 3 shows exemplary front and rear views of the device, showing front and rear cameras.

Referring to FIG. 3, the camera 120 may include a front camera 120a for shooting in a self-portrait mode (referred to herein as "self-mode") and a rear camera 120b for shooting a subject or scene located in front of the user. Front camera 120a and rear camera 120b include front and rear camera lenses 121a and 121b, respectively. In some embodiments, front camera 120a and rear camera 120b each includes its own imaging unit 122, image converter 123 and camera controller 124. With this approach, it is possible to operate the front and rear cameras simultaneously and independently.

In other embodiments, only one of the cameras 120a and 120b is operative at any given time, and one or more of the components 122-124 is shared by the front and rear cameras 120a, 120b. In this case, a switching means (not shown) may be included to selectively switch an image signal path to the image converter 123 between the lenses 121a, 121b of the front and rear cameras 120a, 120b under the control of controller 130 and camera controller 124.

In general, the front camera lens 121a may be provided at the same surface as display 150, i.e., at a front surface of the device 100. The example of FIG. 3 illustrates that a front camera lens 121a is provided a top right end of the display 150, but the present invention is not limited thereto. Locations and the number of the front cameras 120a or lenses 121a may be variously implemented. The camera 120 may generate a signal including information about whether the image is collected from the front camera 120a or is collected from the rear camera 120b together with a signal with respect to the collected image.

The controller 130 may control respective constituent elements for an overall operation of the device 100. For example, the controller 130 may cause the display unit 150 to display a preview image based on the image collected from the camera 120.

According to embodiments of the present invention, the controller 130 generates a preview image with respect to the given region of the display unit 150 formed close to the camera 120 based on the image collected from the camera 120, and controls the display unit 150 to display a preview image on the given region of the display unit 150. In this case, the controller 130 may generate a preview image with respect to entire regions of the display unit 150 based on the collected image and reduces a preview image with respect to the entire regions to the size of the given region of the display unit 150 to generate a preview image with respect to the given region of the display unit 150. The controller 130 may control the display unit 150 to display a preview image with respect to the given region of the display unit 150 on a preview image with respect to the entire images.

In other words, an image is captured through the camera 120, and substantially the entire captured image is displayed as a reduced size preview image in a sub-region (partial region) of the display 150 proximate the front camera lens 121a. The sub-region is a minority portion (less than 50%) of display 150. Substantially the entire captured image means either the entire image or nearly the entire image, e.g., at least 80% of the captured image. The reduced size preview image is an image reduced in size compared to a preview image that would normally be displayed on the entire display 150 (i.e., reduced compared to a "normal size preview image"). The reduced size preview image can be considered a thumbnail image.

According to embodiments, if a shooting or pre-shooting request event occurs, the controller 130 controls the display 150 to display a preview image with respect to the given sub-region of the display 150, i.e., the reduced size preview image is displayed. For example, the event may be an input command on a predetermined shutter key or icon (detected via touch input or the like), or alternatively, a smile detection, eye blinking detection, or a lapse of a preset time in a timer mode.

In embodiments, the controller 130 may generate the reduced size preview image only with respect to the image captured from the front camera 120a. Further, the reduced size preview image may be displayed only when a special mode is set, referred to herein as a "reduced size preview image mode". This mode may be set according to a user selection thereof, e.g., in a settings menu, or by touch input or the like on a representative icon.

The memory 140 may store programs or commands for the device 100. The controller 130 may execute the programs or the commands stored in the memory 140. Memory 140 may include a storage medium having at least one type of a flash memory, a hard disk, a multimedia card micro, a card type of a memory (for example, an SD or XD memory), RAM (Random Access Memory), SRAM (Static Random Access Memory), ROM (Read-Only Memory), EEPROM (Electrically Erasable Programmable Read-Only Memory), PROM (Programmable Read-Only Memory), MRAM (Magnetic RAM), a magnetic disc, and an optical disc.

In embodiments, memory 140 may temporarily or permanently store the finally captured image. Memory 140 may store a shooting time and a shooting place with respect to the stored image, meta data with respect to a setting state, capacity, the size, and a storage format of the camera 120 associated with the image.

Device 100 may of course include more elements than those shown in FIG. 2; however, only elements pertinent to image capture, processing and display are described herein to avoid obscuring the inventive subject matter.

Figure 4:
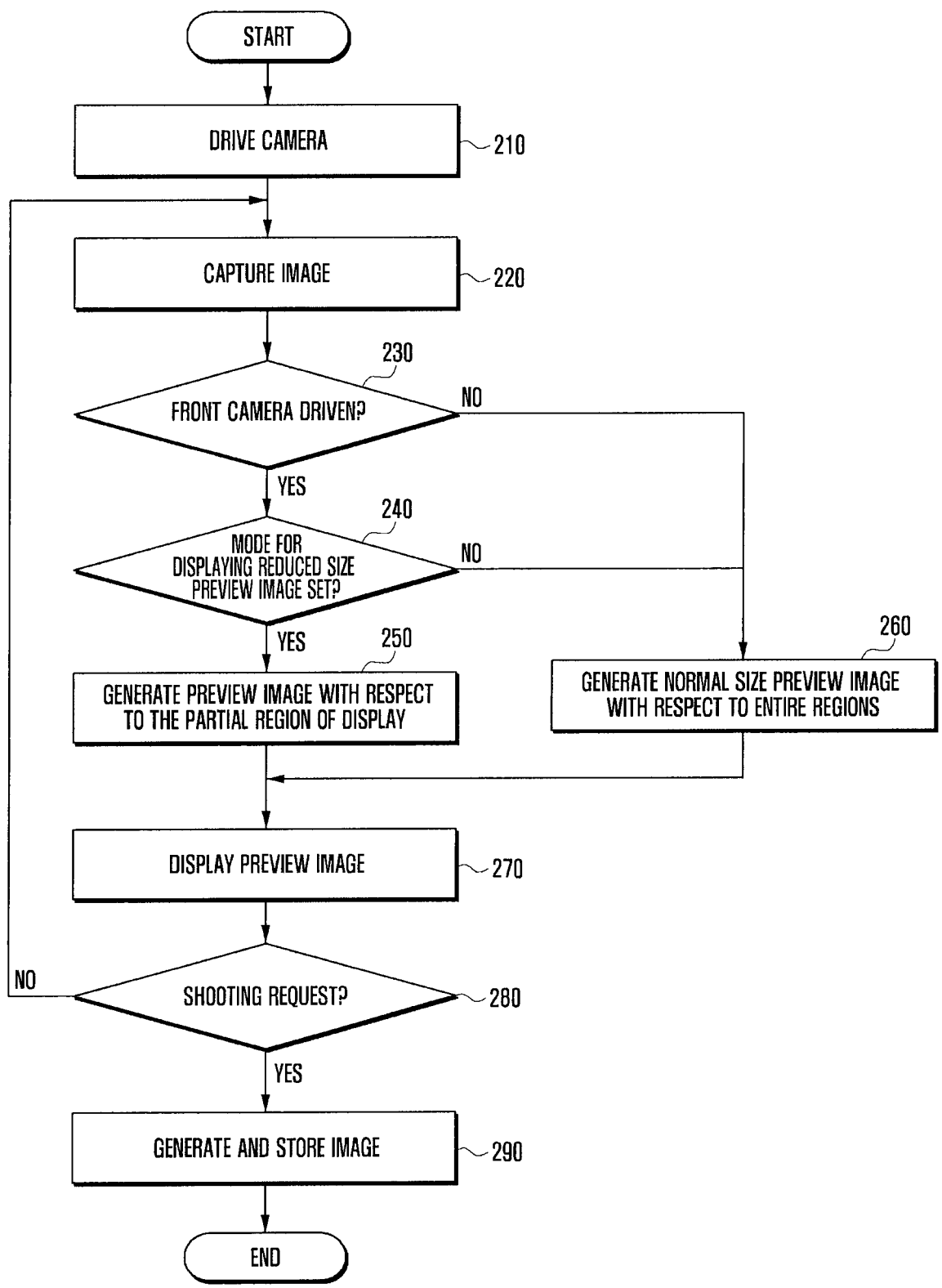
FIG. 4 is a flowchart illustrating a method of controlling a camera of a device according to an exemplary embodiment of the present invention.

FIG. 4 is a flowchart illustrating a method of controlling a camera of a device according to an exemplary embodiment of the present invention. In the following description thereof, it is assumed that controller 130 controls the various operations.

The method starts at step 210 by initiating operation of the camera 120 (driving the camera) Here, the camera may be driven according to a generation request of the user or according to execution of an application, a program, and a service requiring drive of the camera. The front camera 120a or the rear camera 120b may be driven according to a camera mode setting state, or mode setting according to a user request or an application. Note, however, that the reduced size preview images according to the principles described herein are particularly relevant to the front camera 120a operation. For brevity therefore, in the following explanation, description of rear camera 120b operations are omitted. However, in other embodiments, methods for the generation of reduced size preview images can also be applicable to rear camera operations.

The controller 130 transfers a request signal for driving the camera to a camera controller 124 of the camera 120. The camera controller 124 controls respective constituent elements of the camera 120 to convert an optical signal with respect to the image into an electric signal, via imaging unit 122 and image converter 123, and transfers the converted electric signal (image signal) to the controller 130, where it is collected (220) After that, the controller 130 may determine whether the front camera 120a is driven (230). If so, the process determines whether the reduced size preview image mode (discussed earlier) is set (240).

This mode may be set according to a user input or setting by an initial value set during manufacture of the device 100 or an application, a program, or a service driven by the device 100. The reduced size preview image mode (hereafter, "preview image mode," for brevity) may alternatively be called a "guide preview," "partial preview," "self-camera guide," or "self-camera preview" mode.

The controller 130 may control the display unit 150 to display a UI for selecting and setting the preview image mode according to a user input received through the input unit 110.

According to an implementation scheme, when the device 100 is manufactured not to provide a function regarding preview image mode setting, the foregoing step may be omitted. In this case, the preview image mode is set as a default (and preferably, a user may be allowed to disable it in a suitable setting menu).

Figure 5:
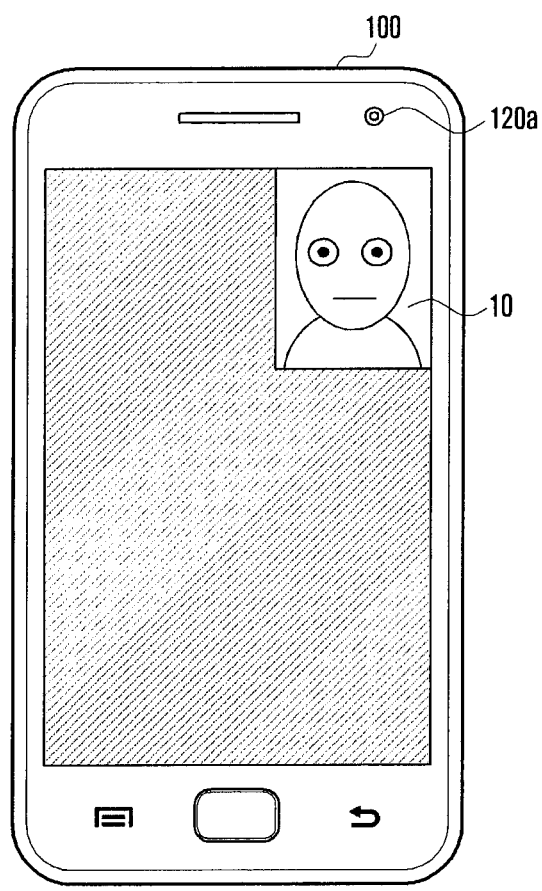
FIG. 5 is a screen example illustrating a reduced size preview image in a portrait mode according to a first embodiment of the present invention.
Figure 6:
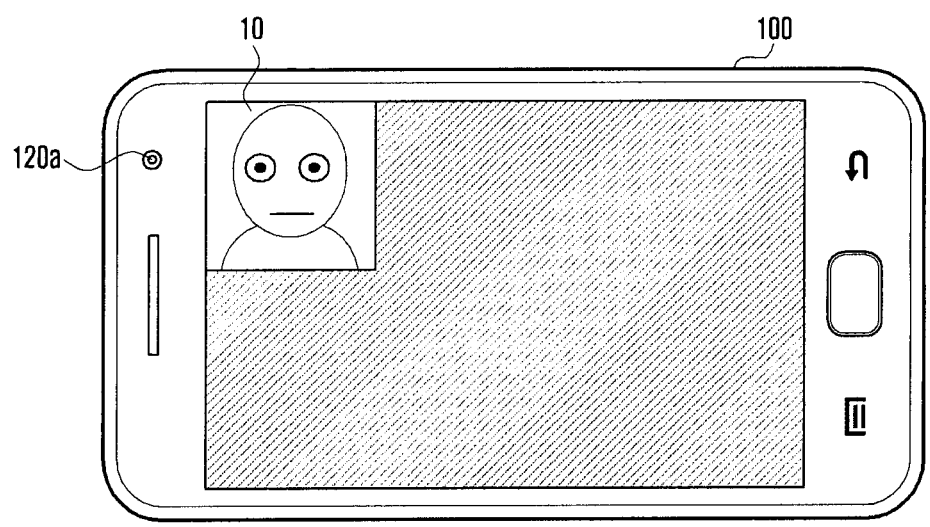
FIG. 6 is a screen example illustrating a reduced size preview image in a landscape mode according to a first embodiment of the present invention.

When the preview image mode is set, the controller 130 generates a preview image within the partial region of the display 150 provided close to the camera (250). As shown in FIG. 5 or FIG. 6, the partial (preferably minority) region is preferably close to the front camera 120a. The partial region may be a threshold region in which the user does not feel unnaturalness because a vision difference with a state of staring at the camera is not significant even if the user shoots a photograph in a state of staring at a partial region. That is, the partial region may be a region for inducing the vision of the user to a region close to the camera, as discussed above. A size, shape, and boundary of the partial region may be set by the user or set during manufacture of the device 100.

The controller 130 may directly generate the reduced size preview image by rendering an image signal received from the camera 120 with respect to the determined partial region of the display 150. In the same manner, the controller 130 may encode the image signal received from the camera 120 to a size of the partial region of the display 150 to generate a preview image, and control the display 150 to display the generated preview image on a partial region, thereby generating the preview image with respect to the partial region.

The controller 130 may generate a preview image with respect to an entire region of the display 150 (i.e., a normal size preview image, as in a conventional portable terminal) by rendering the image signal received from the camera 120 to a size corresponding to the entire region of the display 150, and reduce the normal size preview image to the size corresponding to the partial region, thereby generating the reduced size preview image with respect to the partial region.

A method of generating a preview image with respect to a partial region by the controller 130 may be variously implemented according to an image processing scheme applied to the device 100 within a range consistent with a self portrait.

If, at step 230, the front camera 120a is not driven or the reduced size preview image mode is not set, the controller 130 at step 260 generates a normal size preview image, over the entire display 150. When the front camera 120a is not driven, that is, when the image is not collected by the front camera 120a, the controller 130 generates a normal size preview image according to a general method of controlling a camera.

Subsequently, the controller 130 displays the reduced size or normal size preview image at step 270. Although not shown in FIG. 4, step 270 may include a sub-step of determining whether an overlapped display mode is selected. In an overlapped display mode, described later with reference to FIG. 7, both the reduced size and normal size preview images are displayed together, with the former overlapping the latter.

Next, the controller 130 may determine whether the shooting performing request occurs (280). This request may be determined according to an input signal received from the input unit 110. The input unit 110 may detect the shooting performing request through input through a button or a switch, a touch input through a touch screen, proximity input or pressure input through a pressure sensor included in a bezel of the device 100.

If the shooting request occurs, the controller 130 may generate and store the image (290).

The controller 130 may photograph an image collected from the camera 120 when the shooting request occurs to generate an image. The controller 130 may generate an image of a JPEG or MPEG format based on a shot image according to an image format supported from the device 100.

The controller 130 may temporarily or permanently store the generated image in the memory 140. The controller 130 may store a shooting time and a shooting place of the image, meta data with respect to a setting state, capacity, the size, a storage format of the camera 120 during shooting associated with the image together with the generated image.

FIG. 5 illustrates a screen example depicting an embodiment in which a reduced size preview image 10 is displayed proximate a lens of a front camera 120a, and no part of the captured image is displayed in a remaining region of the display 150. In this case, the controller 130 may process a shade or a different image for the remaining region.

FIG. 5 also illustrates an example of displaying a preview image 10 on a partial region close to the front camera 120a by the controller 130 when shooting in a "portrait" mode. As shown in FIG. 6, when the controller 130 photographs in a "landscape" mode, the controller 130 may display the preview image 10 on a region close to the front camera 120a.

In the examples of FIGS. 5 and 6, the partial region is less than ¼ of the display region of the display 150. However, as described above, some embodiments are designed to allow the user to set the dimensions and locations of the partial region. Preferably, the partial region occupies a minority of the entire display 150.

Figure 7:
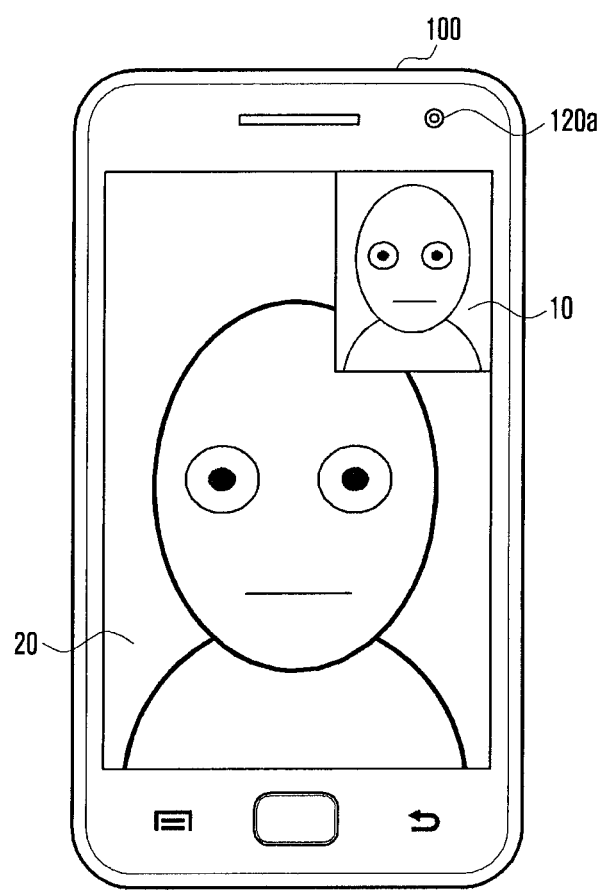
FIG. 7 is a screen example illustrating reduced size and normal size preview images according to a second embodiment of the present invention.

FIG. 7 illustrates an embodiment in which the reduced size preview image is displayed appearing to overlay an enlarged version of the same preview image. In particular, the enlarged version is the same or substantially the same preview image, but sized for display on the entire display 150. Herein, as mentioned earlier, a preview image displayed on the entire display is called a normal size preview image. Thus the controller 130 may display a normal size preview image 20, except for a partial portion thereof removed, and the reduced size preview image 10 is displayed in the removed partial portion. Hence in this embodiment, the reduced size preview image 10 is displayed to appear overlaying or overlapping the normal size preview image 20. In embodiments, the entire normal preview image can be displayed first. Thereafter, a reduced size preview image mode command can be detected, whereupon the controller causes the reduced size preview image to be displayed overlaying the normal preview image as depicted in FIG. 7. This mode command may be an input command of the user, such as touching a pre designated icon.

Alternatively, in certain embodiments of the present invention, the reduced size preview mode command can be automatically detected from a characteristic of the captured image itself, such as a smile. This technique can then be combined with a timer function, to automatically take the picture when a preset timer period elapses, e.g., several seconds following the generation of the reduced size preview image. This approach gives the user a few seconds to refocus his eyes on the preview image once it appears, rather than on the normal size image which can remain displayed overlapping the reduced size image. As another alternative, once the characteristic such as a smile is detected, the normal size preview image may be caused to disappear while the reduced size preview image is displayed (as in the screen examples of FIG. 5 OR 6). An example of a smile detection method which may be automatically followed by a timer is described next in connection with FIG. 8.

For instance, the controller 130 may display the reduced size preview image according to generation of an event corresponding to a pre-shooting request. In detail, the controller 130 may first generate and display a normal size preview image on display 150. Next, controller 130 may determine whether an event corresponding to a pre-shooting request occurs. For example, this event may include smile detection, eye blinking detection, or lapse of a preset time in a timer mode. The controller 130 may implement various image recognition algorithms recognizing a human face to detect whether smile or eye blinking occurs in the image.

If the event corresponding to the pre-shooting request occurs, the controller 130 may display the reduced size preview image. If the pre-shooting request occurs after displaying the normal size preview image, the controller 130 may then display the reduced size preview image.

Figure 8:
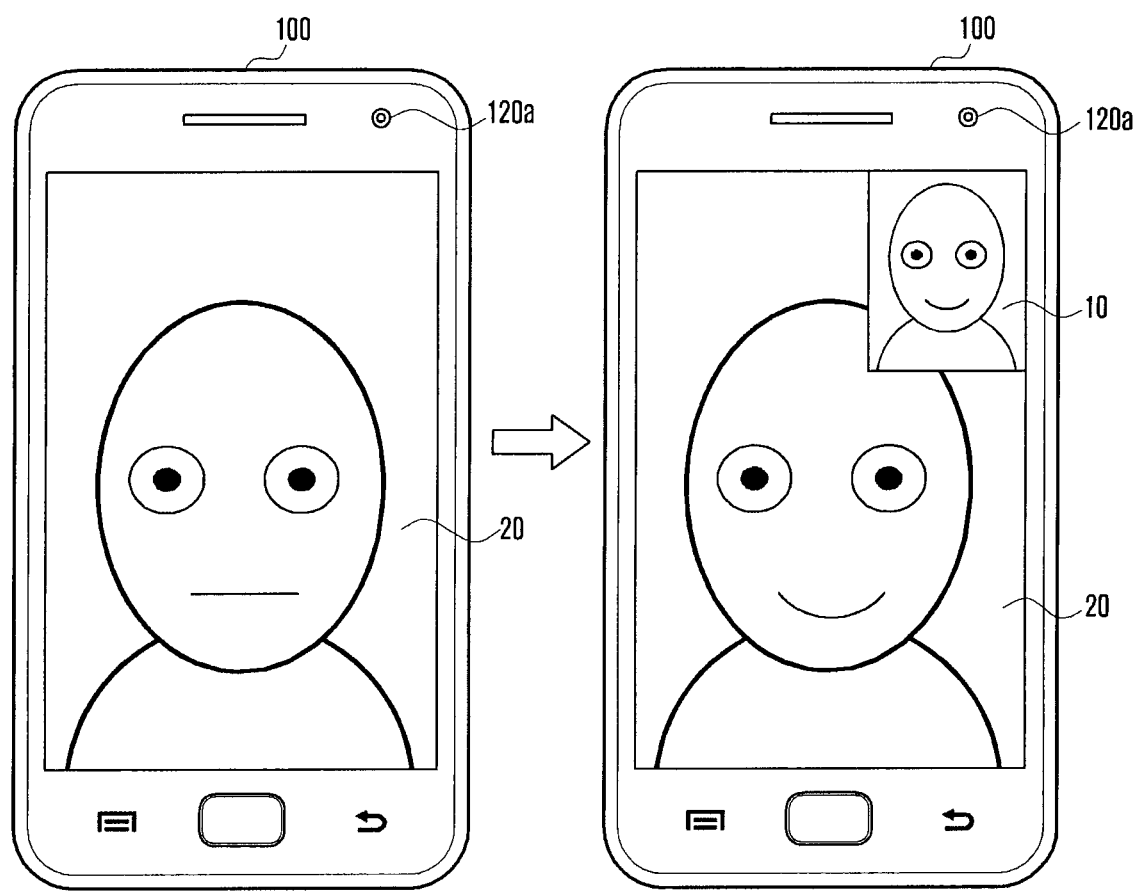
FIG. 8 is a screen example illustrating preview images according to a third embodiment of the present invention.

For example, referring to FIG. 8, the controller 130 may display a normal size preview image 20 with respect to the entire regions of the display 150. If the smile detection event occurs as the event corresponding to the pre-shooting request, the controller 130 may display a reduced size preview image 10 with respect to the partial region of the display 150 provided close to the camera 120a. In this case, the controller 130 may display the reduced preview image 10 with respect to the partial region to overlap with the normal preview image 20. Thereafter, the preview image may be finally captured and stored automatically after a preset time, e.g., one to several seconds, giving the user time to gaze in the direction of the reduced size preview image 10.

Figure 9:
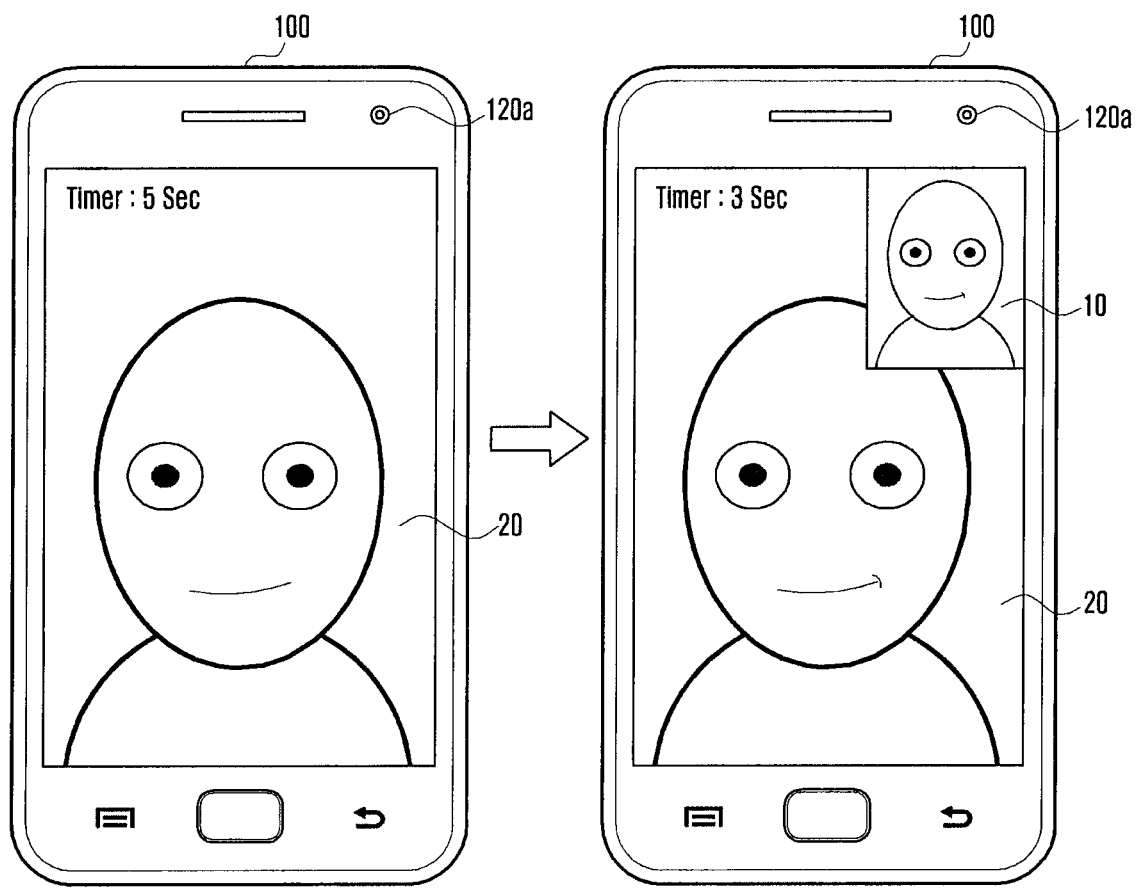
FIG. 9 is a screen example illustrating a preview image according to a fourth embodiment of the present invention.

FIG. 9 illustrates another embodiment of the present invention, which employs a timer function. In this embodiment, the controller 130 may detect lapse of a preset time in a timer mode by the event corresponding to a pre-shooting request. When a time set by timer mode setting is a first time period, e.g., five seconds, the controller 130 photographs when five seconds lapses after the pre-shooting request is generated. While counting five seconds in the timer mode, the controller 130 may display a normal size preview image 20 on display 150. If a preset time among a time set in the timer mode lapses and a second preset time, e.g., three seconds, remains, the controller 130 may display the reduced size preview image 10. The preset time may be set by the user or in a default value during manufacture of the device 100. For example, the preset time may be a time from a time set in the timer mode to a time before three seconds in performing shooting. The controller 130 may display the preview image 10 with respect to the partial region to overlap with the preview image with respect to the entire region. For example, after an additional three seconds elapse following the display of reduced size preview image 10, the image is finally captured. Thus, the user is given sufficient time to refocus her eyes on the small preview image 10 which is near the camera 120a, prior to the picture actually being taken and stored.

As described above, the method of controlling a camera of the present invention displays a preview image on the given region of the display unit 150 provided close to the camera to minimize a vision difference between the camera and the preview image so that eyes of the user on a photograph appear natural even if the user shoots a photograph while viewing the preview image.

According to an embodiment of the present invention, the controller 130 may cause the displayed preview image 10 to be moved. In detail, the controller 130 may detect input of the user with respect to the preview image 10 displayed on the display unit 150 according to an input signal received from the input unit 110. The user input with respect to the preview image 10 may be touch input or proximity input, and may be configured by touch and drag operation, flip operation, or pinch-in/out operation.

Figure 10:
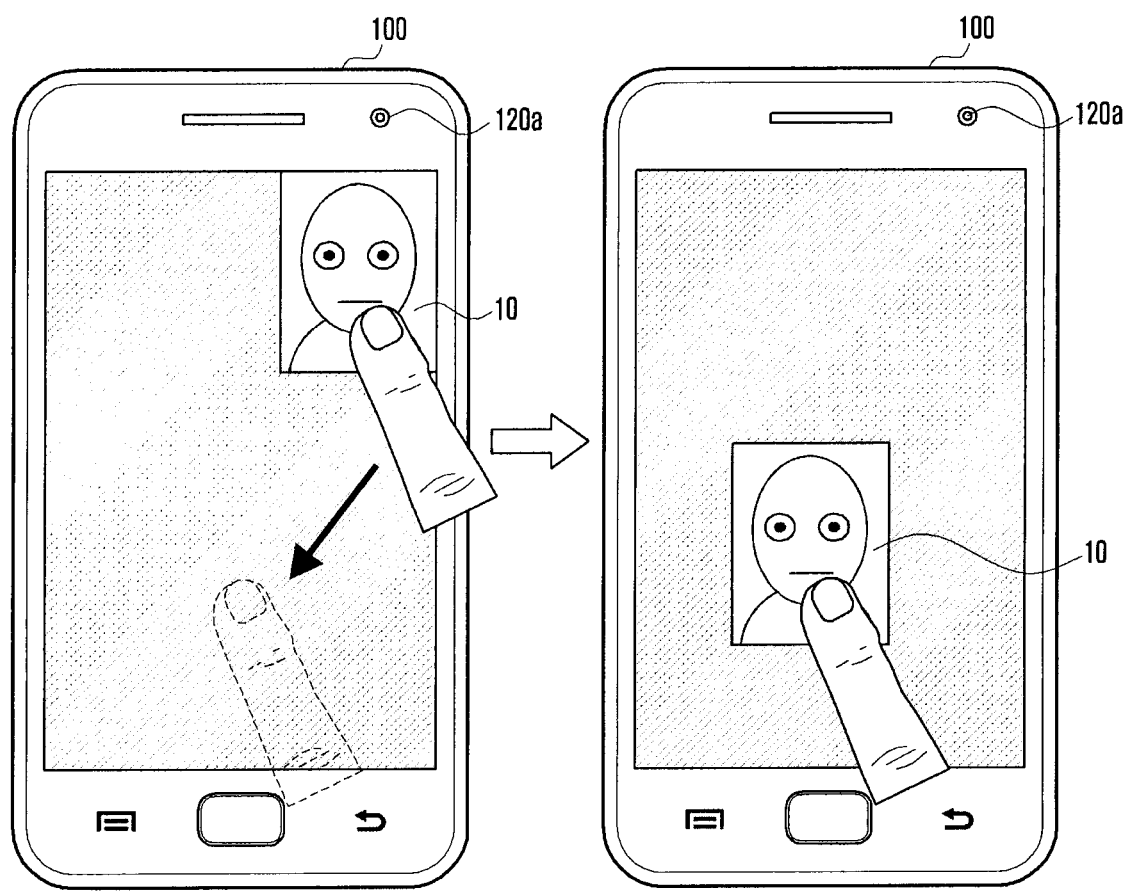
FIG. 10 is a screen example illustrating an example of moving a preview image according to an embodiment.

The controller 130 may move a preview image 10 displayed corresponding to the user input. For example, as shown in FIG. 10, when the user input is an input of touching the preview image 10 and dragging the preview image 10 to another location, the controller 130 may move the preview image 10 according to a location of the drag input. Accordingly, to photograph in a state the user changes the vision to another location without viewing the camera 120a, the user may photograph while confirming the user's feature through the preview image 10.

In addition to moving the preview image 10, the controller 130 may display menus, reporting, and help with respect to the preview image 10 corresponding to input of the user in a pop-up form.

Methods of controlling a camera and a device thereof according to the present invention can minimize unnaturalness of eye process of the user during shooting using the front camera in a device in which the center of the display is far from the front camera due to the size of the display.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An electronic device, comprising:
   a front camera;
   a rear camera;
   a touch display screen disposed at the same side of the electronic device as the front camera; and
   a controller configured to:
   control the front camera to acquire images of a user of the electronic device in a self-shooting mode,
   control the touch display screen to display a first live preview image based on the acquired images,
   receive a capturing request from the user while displaying the first live preview image,
   activate a timer in response to receiving the capturing request,
   display, while the timer is activated during the self-shooting mode, a visual cue proximate to an edge of the touch display screen with the displayed first live preview image,
   wherein the visual cue is located in close proximity to the front camera, whereby when the electronic device is held in a hand of the user and the user looks towards the visual cue, a first line of sight between the user's eyes and the visual cue is substantially aligned to a second line of sight between the user's eyes and the front camera, and wherein the visual cue comprises a second live preview image based on the acquired images.

2. The device of claim 1, wherein the visual cue further comprises at least one of an image and text.

3. The device of claim 1, wherein the controller is further configured to control the touch display screen to display the second live preview image in a partial region of the touch display screen proximate to a lens of the front camera.

4. The device of claim 1, wherein the visual cue comprises information, and wherein the controller is further configured to control the touch display screen to display the information in a partial region of the touch display screen proximate to a lens of the front camera.

5. The device of claim 4, wherein second preview image is displayed in the partial region to guide the user's gaze.

6. The device of claim 1, wherein the controller is further configured to display the visual cue if a cue-providing feature of the device is turned on.

7. The device of claim 1, wherein the controller is further configured to display the visual cue with the first live preview image if the timer is set.

8. The device of claim 1, wherein the controller is further configured to control the touch display screen to display a user interface for setting the visual cue.

9. The device of claim 3, wherein the controller is further configured to:
detect a rotation of the device from a first orientation to a second orientation while the first live preview image is displayed with the second live preview image, and
control the touch display screen to rotate the first live preview image and the second live preview image according to the detected rotation of the device and to display the rotated second live preview image in a partial region of the touch display screen proximate to the lens of the front camera.

10. The device of claim 3, wherein,
if the device is in a first orientation, the second live preview image is displayed in a region proximate to the lens of the front camera, and
if the device is in a second orientation different from the first orientation, the second live preview image is displayed in the region proximate to the lens of the front camera.

11. The device of claim 3, wherein the controller is further configured to control the touch display screen to display the second live preview image partially over the first live preview image.

12. The electronic device of claim 1, wherein the visual cue further comprises a user interface related to the timer.

13. An apparatus comprising:
a front camera;
a rear camera;
a touch display screen disposed at a same side of the apparatus as the front camera; and
a controller configured to:
acquire, using the front camera, an image corresponding to a user of the apparatus in a self-shooting mode;
display, using the touch display screen, a first live preview image based at least in part on the image;
receive a capturing request from the user while displaying the first live preview image;
activate a timer in response to receiving the capturing request; and
automatically display, while the timer is activated during the self-shooting mode, an indication to guide a vision of the user in a partial region of the touch display screen, the partial region being located in close proximity to a lens of the front camera, whereby when the apparatus is held in a hand of the user and the user looks towards the indication, a first line of sight between the user's eyes and the indication is substantially aligned to a second line of sight between the user's eyes and the lens of the front camera,
wherein the indication comprises a second live preview image.

14. The apparatus of claim 13, wherein the controller is configured to:
generate the second live preview image based at least in part on the image.

15. The apparatus of claim 13, wherein the controller is configured to:
generate the second live preview image based at least in part on the first live preview image.

16. The apparatus of claim 13,
wherein the controller is configured to:
present additional information with respect to the second live preview image.

17. The apparatus of claim 16, wherein the controller is configured to:
display a menu, a notification, or a guide with respect to the second live preview image.

18. The apparatus of claim 13, wherein the indication further comprises a user interface related to the timer.

19. An electronic device, comprising:
a front camera;
a rear camera;
a touch display screen disposed at the same side of the electronic device as the front camera; and
a controller configured to:
control the front camera to acquire images of a user of the electronic device in a self-shooting mode,
control the touch display screen to display a first image based on the acquired images,
receive a capturing request from the user while displaying the first image,
activate a timer in response to receiving the capturing request, and
display a second image together with the first image by displaying, while the timer is activated during the self-shooting mode in response to the capturing request, the second image in a partial region of the touch display screen located in close proximity to a lens of the front camera, wherein the second image is displayed to induce the user to look towards the front camera,
whereby when the electronic device is held in a hand of the user and the user looks towards the second image, a first line of sight between the user's eyes and the second image is substantially aligned to a second line of sight between the user's eyes and the lens of the front camera.

20. The electronic device of claim 19, wherein the second image further comprises a user interface related to the timer.

21. An electronic device, comprising:
a front camera;
a rear camera;
a touch display screen disposed at the same side of the electronic device as the front camera; and a controller configured to:
control the front camera to acquire images of a user of the electronic device in a self-shooting mode,
control the touch display screen to display first live preview images based on the images acquired via the front camera in the self-shooting mode,
receive a capturing request from the user while displaying the first live preview images,
activate a timer in response to receiving the capturing request, and
display, while the timer is activated during the self-shooting mode, a visual cue to induce the user to look towards the front camera, wherein the visual cue is proximate to an edge of the touch display screen,
wherein the visual cue is located in close proximity to the front camera, whereby when the electronic device is held in a hand of the user and the user looks towards the visual cue, a first line of sight between the user's eyes and the visual cue is substantially aligned to a second line of sight between the user's eyes and the front camera, and
wherein the visual cue comprises a second live preview image based on the images acquired via the front camera.

22. The device of claim 21, wherein the visual cue further comprises at least one of an image and text.

23. The device of claim 21, wherein the visual cue is displayed by the controller by causing the touch display screen to display the second live preview image in a partial region of the touch display screen proximate to a lens of the front camera.

24. The device of claim 21, wherein the visual cue comprises information, and wherein the controller is further configured to control the touch display screen to display the information in a partial region of the touch display screen proximate to a lens of the front camera.

25. The device of claim 24, wherein the second live preview image is displayed in the partial region to guide the user's gaze.

26. The device of claim 21, wherein the controller is further configured to display the visual cue if a cue-providing feature of the electronic device is turned on.

27. The device of claim 21, wherein the controller is further configured to display the visual cue with the first live preview images if the timer is set.

28. The device of claim 21, wherein the controller is further configured to control the touch display screen to display a user interface for setting the visual cue.

29. The device of claim 23, wherein the controller is further configured to:
detect a rotation of the device from a first orientation to a second orientation while the first live preview images are displayed with the second live preview image, and
control the touch display screen to rotate the first live preview images and the second live preview image according to the detected rotation of the device and to display the rotated second live preview image in a partial region of the touch display screen proximate to the lens of the front camera.

30. The device of claim 23, wherein,
if the device is in a first orientation, the second live preview image is displayed in a region proximate to the lens of the front camera, and
if the device is in a second orientation different from the first orientation, the second live preview image is displayed in the region proximate to the lens of the front camera.

31. The device of claim 23, wherein the controller is further configured to control the touch display screen to display the second live preview image partially over the first live preview images.

32. The device of claim 21, wherein the timer is activated in response to an activation request made during the self-shooting mode.

33. The device of claim 21, wherein the controller is configured to activate timer in response to an activation request made during the self-shooting mode and display the visual cue while the timer is activated during the self-shooting mode.

34. The device of claim 21, wherein the controller is configured to provide guide information regarding to the visual cue.

35. The device of claim 21, wherein the controller is configured to provide a menu regarding to the visual cue.

36. The device of claim 21, wherein the controller is configured to display the visual cue after setting an option regarding to the visual cue.

37. The device of claim 21, wherein the controller is configured to provide a guide message regarding to the visual cue.

38. The device of claim 21, wherein the second live preview image is provided together with the first live preview images.

39. The device of claim 21, wherein the visual cue is displayed together with the first live preview images, and the visual cue is configured to cause the user looking at a facial area of the first live preview images to look towards a lens of the front camera.

40. The device of claim 21, wherein the controller is configured to display the visual cue with the first live preview images to cause the user gazing at the first live preview images displayed on the touch display screen which is provided in a center portion of the electronic device to look towards the front camera disposed in an upper portion or lower portion of the electronic device.

41. The device of claim 21, wherein the visual cue is displayed in a partial region of the touch display screen proximate to a lens of the front camera while the first live preview images are displayed in the touch display screen.

42. The device of claim 21, wherein the controller is configured to display timer information together with the first live preview images while the timer is activated in the self-shooting mode, and the timer information is displayed separately from the visual cue.

43. The device of claim 21, wherein the controller is configured to capture, after expiration of the timer, at least one image based on the images acquired via the front camera.

44. The device of claim 21, wherein the controller is configured to display the visual cue with the first live preview images to cause the user gazing at the first live preview images displayed on the touch display screen to look towards the front camera disposed in an upper portion or lower portion of the electronic device.

45. The device of claim 21, wherein the visual cue is displayed together with the first live preview images, and wherein the visual cue is displayed in a partial region of the touch display screen proximate to a lens of the front camera while the first live preview images are displayed in the touch display screen.

46. The device of claim 21, wherein the controller is configured to display the visual cue with the first live preview images, and to display timer information together with the first live preview images while the timer is activated in the self-shooting mode, and wherein the timer information is displayed separately from the visual cue.

47. The device of claim 21, wherein the controller is configured to display the visual cue with the first live preview images, and to capture, after expiration of the timer, at least one image based on the images acquired via the front camera.

48. The device of claim 21, wherein the controller is configured to display the visual cue, in a partial region of the touch display screen proximate to a lens of the front camera, with the first live preview images to cause the user gazing at the first live preview images displayed on the touch display screen to look towards the front camera disposed in an upper portion or lower portion of the electronic device.

49. The device of claim 21, wherein the controller is configured to display the visual cue with the first live preview images to cause the user gazing at the first live preview images displayed on the touch display screen to look towards the front camera disposed in an upper portion or lower portion of the electronic device, and wherein the controller is further configured to display timer information together with the first live preview images while the timer is activated in the self-shooting mode, and wherein the timer information is displayed separately from the visual cue.

50. The device of claim 21, wherein the controller is configured to display the visual cue with the first live preview images to cause the user gazing at the first live preview images displayed on the touch display screen to look towards the front camera disposed in an upper portion or lower portion of the electronic device, and wherein the controller is configured to capture, after expiration of the timer, at least one image based on the images acquired via the front camera.

51. The device of claim 21, wherein the visual cue is displayed in a partial region of the touch display screen proximate to a lens of the front camera while the first live preview images are displayed in the touch display screen, thereby causing the user looking at a facial area of the first live preview images to look towards a lens of the front camera.

52. The device of claim 21, wherein the controller is configured to display timer information together with the first live preview images while the timer is activated in the self-shooting mode, and the timer information is displayed separately from the visual cue, and wherein the visual cue is configured to cause the user looking at a facial area of the first live preview images to look towards a lens of the front camera.

53. The device of claim 21, wherein the controller is configured to capture, after expiration of the timer, at least one image based on the images acquired via the front camera, and wherein the visual cue is configured to cause the user looking at a facial area of the first live preview images to look towards a lens of the front camera.

54. The device of claim 21, wherein the visual cue is displayed together with the first live preview images.

55. The device of claim 21, wherein the visual cue is configured to cause the user looking at a facial area of the first live preview images to look towards a lens of the front camera.

56. The device of claim 21, wherein the visual cue is displayed together with the first live preview images, thereby causing the user looking at a facial area of the first live preview images to look towards a lens of the front camera.

57. The device of claim 21, wherein the controller is configured to display the visual cue together with the first live preview images thereby causing the user looking at a facial area of the first live preview images to look towards a lens of the front camera, and wherein the controller is further configured to display timer information together with the first live preview images while the timer is activated in the self-shooting mode, and the timer information is displayed separately from the visual cue.

58. The device of claim 21, wherein the controller is configured to display the visual cue together with the first live preview images, thereby causing the user looking at a facial area of the first live preview images to look towards a lens of the front camera, and wherein the controller is further configured to capture, after expiration of the timer, at least one image based on the images acquired via the front camera.

* * * * *